Patented July 5, 1932                                                    1,866,184

UNITED STATES PATENT OFFICE

RICHARD WEHSARG, OF ESCHAU, GERMANY, ASSIGNOR TO "SAYA" GESELLSCHAFT ZUR HERSTELLUNG VON HEILMICH, OF MUNICH, GERMANY, A COMPANY OF GERMANY

PROCESS FOR INCREASING THE DIGESTIBILITY AND PHARMACOLOGICAL ACTION OF ANIMAL MILK

No Drawing. Application filed October 19, 1929, Serial No. 401,015, and in Germany November 10, 1928.

This invention is based on the newly recognized fact that the digestibility of cow's milk depends upon a far reaching decomposition of the casein contained therein. In order to bring about this casein decomposition the milk is converted into a stable fermented form. This is effected by filtering the milk, introducing it into bottles or other vessels, cooling and preferably inoculating it whilst maintaining the cooling temperature and also freeing it, as far as possible, from oxygen.

According to one modification the new process is effected by filtering the whole milk or the skim milk after removing the cream by centrifuging, cooling to 8–10° C. and mixing with it a culture, which consists partly of lactic acid bacteria. This mixing with lactic acid bacteria, the so-called "inoculating," however, is not absolutely necessary, and its omission also results in a considerable simplification of the process. Merely as an example of the culture which may be employed, said culture may comprise the following: *Streptococcus lacticus*, *Streptococcus kefir*, *Streptococcus citrovorus*, *Bacillus acidi lactici*, and in some cases small parts of *Micrococcus acidi lac-volactici* may be added. The milk is then filled into the storage vessels in the complete absence of air. The displacement of air is with advantage effected by passing in nitrogen, hydrogen or carbon dioxide. In general it is advisable to employ carbon dioxide in the usual carbon dioxide apparatus. The milk is allowed to ferment in the hermetically sealed vessels for about six weeks at about 8° C., during which time it must remain at rest as much as possible and variation in the temperature be avoided. In this way milk is obtained, which is particularly characterized by an intensive protein-decomposition. It has been found that 55% of the total nitrogen of the milk is converted into soluble form. The solubility of the milk protein does not, however, depend only on the quantity, but also very largely on the degree of decomposition, since 8.4% of the residual nitrogen escapes as ammonia nitrogen, the remainder being distributed between albumoses and peptone. At the same time a lactic acid fermentation takes place which results in a degree of acidity (Henkel-Soxhlet) of 52. A weak alcoholic fermentation also takes place but only results in an alcohol content of 0.14%, whilst the carbon dioxide content amounts to 0.3%.

The chemical decomposition and the nature and strength of the fermentation are presumably to be traced to the particular diplococci and streptococci, which represent the main growths in the oxygen-free medium. The greater portion of the resulting carbon dioxide most probably has its origin in a streptococcus, which is capable of abundant gas formation in a closed space.

The milk brought to the above mentioned stage of fermentation, or to maturity, may be maintained unchanged for several weeks, and, on cooling with ice, for several months.

It has further been found that the nutritive and therapeutic value of the milk treated according to the above described process may be increased by an addition of yolk of egg or other nutritive substances before introducing the milk into bottles or the like. The protein of the added substances is also to a large extent decomposed thereby.

The therapeutic action is attributable to the fact that the human organism is not called upon to perform the casein decomposition and thus, in the case of patients having deficient gastro-intestinal action, the nutrient substances of the milk are absorbed in spite of this deficiency. Further, the carbon dioxide formed during the fermentation tears the individual milk particles apart, and thus considerably increases the adsorption surface available for the action of the digestive fluids. Experiments have shown that the zymogens of the milk are converted during the fermentation to enzymes. These only become really active under the influence of the body-heat and assist the intestinal ferments during digestion and are even able to replace them.

Experiments have further shown that the vitamin content of the milk prepared in this manner is extraordinarily high and that the latter contains specific substances, which, considered chemically, probably consist of individual decomposition products of protein. These substances, which have a particularly favourable action, are absent from the known milk preparations.

What I claim is:—

1. A process for increasing the digestibility and pharmacological action of animal milk, including either the whole milk as it leaves the cow or the skim milk freed from cream, in order to effect as far reaching a decomposition of the casein as possible and partially to amino acids, consisting in converting the raw milk containing cultures capable of splitting casein into simpler nitrogen compounds to a stable fermented form by cooling the milk to a low temperature and substantially freeing it from oxygen, and thereafter storing the milk for 4 to 6 weeks in hermetically sealed vessels at a low temperature.

2. A process as claimed in claim 1 in which the raw milk in vessels is cooled to about 8° to 10° C. and treated with a culture which consists of *Streptococcus lactis* and *Streptococcus kefir*, and in which the freeing from oxygen is in a carbon dioxide atmosphere whilst being continually maintained at the cooling temperature, and in which the milk while stored in the hermetically sealed vessels is kept at a temperature of about 8° to 10° C.

3. A process for increasing the digestibility and pharmacological action of animal milk, including either the whole milk as it leaves the cow or the skim milk freed from cream, in order to effect as far reaching a decomposition of the casein as possible and partially to amino acids, consisting in converting the raw milk containing cultures capable of splitting casein into simple nitrogen compounds to a stable fermented form by substantially freeing it from oxygen, and thereafter storing the milk for 4 to 6 weeks in hermetically sealed vessels at a low temperature.

4. A process as claimed in claim 3 in which the raw milk in vessels is treated with a culture which consists of *Streptococcus lactis* and *Streptococcus kefir*, in which the freeing from oxygen is in a carbon dioxide atmosphere, and in which the milk while stored in the hermetically sealed vessels is kept at a temperature of about 8° to 10° C.

In testimony whereof I have hereunto affixed my signature this 5th day of October, 1929.

RICHARD WEHSARG.